(12) United States Patent
Haver et al.

(10) Patent No.: US 10,831,760 B2
(45) Date of Patent: Nov. 10, 2020

(54) DATA STREAM MONITORING

(71) Applicant: Viavi Solutions Inc., Milpitas, CA (US)

(72) Inventors: Joe Haver, Colorado Springs, CO (US); Howard John Thomas, Stonehouse (GB); John Govert, Chapel Hill, NC (US)

(73) Assignee: VIAVI Solutions Inc., San Jose, CA (US)

( * ) Notice: Subject to any disclaimer, the term of this patent is extended or adjusted under 35 U.S.C. 154(b) by 359 days.

(21) Appl. No.: 15/697,207

(22) Filed: Sep. 6, 2017

(65) Prior Publication Data
US 2018/0075106 A1 Mar. 15, 2018

Related U.S. Application Data

(60) Provisional application No. 62/393,961, filed on Sep. 13, 2016.

(51) Int. Cl.
*G06F 16/2455* (2019.01)
*H04L 12/26* (2006.01)
(Continued)

(52) U.S. Cl.
CPC ...... *G06F 16/24568* (2019.01); *H04L 43/026* (2013.01); *H04L 43/028* (2013.01);
(Continued)

(58) Field of Classification Search
CPC . G06F 16/24568; H04L 1/0045; H04L 43/12; H04L 43/026; H04L 43/028;
(Continued)

(56) References Cited

U.S. PATENT DOCUMENTS 6,836,466 B1 * 12/2004 Kant ............... H04L 29/06
370/232
10,116,553 B1 * 10/2018 Penno .............. H04L 45/306
(Continued)

FOREIGN PATENT DOCUMENTS

EP    1 772 992    4/2007

OTHER PUBLICATIONS

Capello et al., "A packet based method for passive performance monitoring", Draft from Internet Engineering Task Force, retrieved from: https://tools.ietf.org/html/draft-tempia-ippm-p3m-03, Published Mar. 21, 2016 (Year: 2016).*

(Continued)

*Primary Examiner* — David T. Brooks
(74) *Attorney, Agent, or Firm* — Harrity & Harrity, LLP

(57) ABSTRACT

A first device for determining measurement information for a network may include one or more processors. The first device may identify one or more data streams of frames for monitoring. The first device may modify the frames of the one or more identified streams to identify the frames as one or more of count frames to be used to identify a quantity of dropped frames, or to identify the frames as measurement frames to be used to determine latency or jitter. The first device may transmit the one or more data streams toward a second device to permit the second device to collect measurement information based on identifying the count frames or the measurement frames.

20 Claims, 7 Drawing Sheets

(51) Int. Cl.
*H04L 12/801* (2013.01)
*H04L 1/00* (2006.01)
(52) U.S. Cl.
CPC ........ *H04L 43/087* (2013.01); *H04L 43/0829* (2013.01); *H04L 43/0835* (2013.01); *H04L 43/0858* (2013.01); *H04L 47/10* (2013.01); H04L 1/0045 (2013.01); H04L 43/12 (2013.01)
(58) Field of Classification Search
CPC ............. H04L 43/0835; H04L 43/0858; H04L 43/087; H04L 47/10; H04L 43/0829
See application file for complete search history.

(56) References Cited

U.S. PATENT DOCUMENTS

| | | | | |
|---|---|---|---|---|
| 2007/0081471 | A1* | 4/2007 | Talley, Jr. | H04L 43/028 370/252 |
| 2008/0019371 | A1* | 1/2008 | Anschutz | H04L 47/10 370/394 |
| 2009/0219811 | A1* | 9/2009 | Dolganow | H04L 43/08 370/231 |
| 2009/0252148 | A1* | 10/2009 | Dolganow | H04L 65/605 370/351 |
| 2010/0008250 | A1* | 1/2010 | Nomura | H04L 43/0835 370/252 |
| 2010/0208611 | A1* | 8/2010 | Ray | H04L 45/00 370/252 |
| 2011/0188380 | A1* | 8/2011 | Song | H04L 43/0829 370/241.1 |
| 2012/0026869 | A1* | 2/2012 | Wang | H04L 41/5003 370/230 |
| 2013/0007234 | A1* | 1/2013 | Bartfai-Walcott | H04L 47/2433 709/223 |
| 2013/0223274 | A1* | 8/2013 | Cociglio | H04L 43/00 370/253 |
| 2014/0137188 | A1* | 5/2014 | Bartholomay | G06Q 30/0251 726/3 |
| 2014/0226514 | A1* | 8/2014 | Zhou | H04L 43/0829 370/252 |
| 2014/0328206 | A1* | 11/2014 | Chan | H04L 43/026 370/253 |
| 2016/0149784 | A1* | 5/2016 | Zhang | H04B 1/0003 370/229 |
| 2016/0330111 | A1* | 11/2016 | Manghirmalani | H04L 43/028 |
| 2017/0244623 | A1* | 8/2017 | Cociglio | H04L 43/022 |
| 2018/0070246 | A1* | 3/2018 | Jack | H04W 24/08 |

OTHER PUBLICATIONS

Mirsky et al, "Performance Measurement (PM) with Marking Method in Bit Index Explicit Replication (BIER) Layer", retrieved from: https://tools.ietf.org/html/draft-mirsky-bier-pmmm-oam-00, Published Sep. 21, 2015 (Year: 2015).*
Extended European Search Report corresponding to EP 17190715.7 dated Nov. 24, 2017, 8 pages.
Hofstede et al., "Flow Monitoring Explained: From Packet Capture to Data Analysis With NetFlow and IPFIX," IEEE Communication Surveys & Tutorials, vol. 16, No. 4, Apr. 24, 2014, pp. 2037-2064, 28 pages.
Chen et al., "Coloring based IP Flow Performance Measurement Framework; draft-chen-ippm-coloring-based-ipfpm-framework-01," Oct. 21, 2013, 23 pages.
Capello A., et al., "A Packet Based Method for Passive Performance Monitoring Draft-Tempia-Opsawg-P3m-04.txt," Internet Engineering Task Force, IETF; Standard Working Draft, Internet Society (ISOC) 4, Rue Des Falaises CH-1205 Geneva, Switzerland, Feb. 13, 2014, pp. 1-20, XP015096829.
Mach Chen et al., "IP Flow Performance Measurement (IPFPM) Framework," https://www.ietf.org/proceedings/92/slides/slides-92-ippm-2.pdf, Mar. 2015, 13 pages.

* cited by examiner

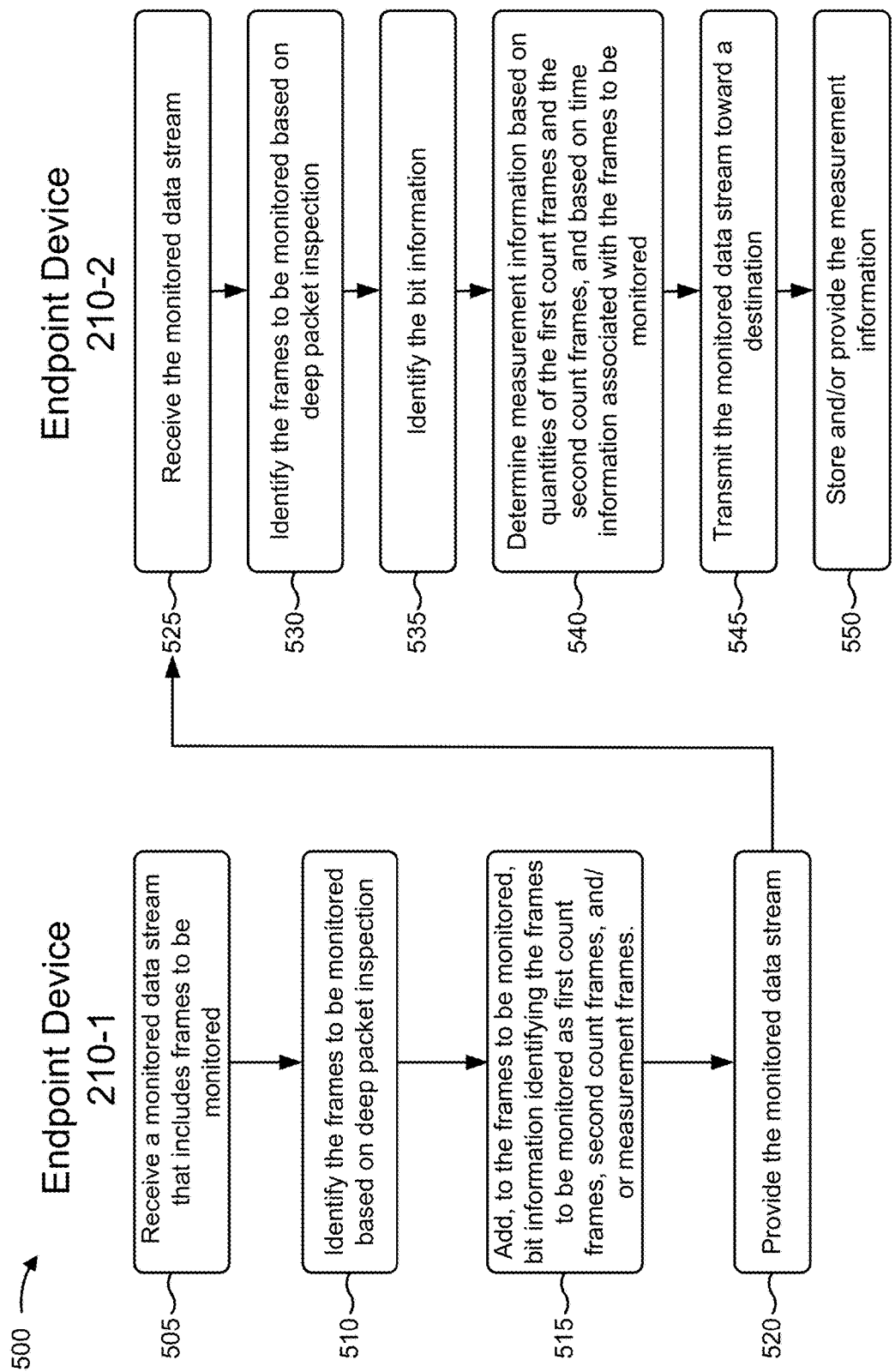

DATA STREAM MONITORING

RELATED APPLICATION(S)

This application claims priority under 35 U.S.C. § 119 to U.S. Provisional Patent Application No. 62/393,961, filed on Sep. 13, 2016, the content of which is incorporated by reference herein in its entirety.

BACKGROUND

Network services may be provided via a network. The network services may be provided based on frames or packets, which include a payload of data and a header that identifies information relevant to routing or handling the frames or packets. In some cases, the payload of a frame or packet may also include information relevant to handling the frame or packet. For example, a first frame may be encapsulated as a payload of a second frame (e.g., when the first frame and the second frame are associated with different layers of the Open Systems Interconnection (OSI) model).

SUMMARY

According to some possible implementations, a first device for determining measurement information for a network may include one or more processors. The one or more processors may identify one or more data streams of frames for monitoring. The one or more processors may modify the frames in one or more identified streams to identify the frames as count frames to be used to identify a quantity of dropped frames, or measurement frames to be used to determine latency or jitter. The one or more processors may transmit the one or more data streams toward a second device to permit the second device to collect measurement information based on identifying the count frames or the measurement frames.

According to some possible implementations, a non-transitory computer-readable medium may store one or more instructions that, when executed by one or more processors of a first device, may cause the one or more processors to identify a monitored data stream of frames based on information included in payloads of the frames. The one or more instructions, when executed by the one or more processors, may cause the one or more processors to modify the frames to identify the frames as count frames to be used to identify a quantity of dropped frames and/or measurement frames to be used to determine latency or jitter. The one or more instructions, when executed by the one or more processors, may cause the one or more processors to transmit the monitored data stream toward a second device to permit the second device to collect measurement information based on identifying the count frames or the measurement frames.

According to some possible implementations, a method for determining measurement information for a network may include receiving, by a first device and from a second device, a data stream of frames. The method may include identifying, by the first device, the data stream as a monitored data stream based on information included in payloads of the frames. The method may include identifying, by the first device and based on information included in the payloads of the frames, the frames as one or more count frames to be used to identify a quantity of dropped frames, or measurement frames to be used to determine latency or jitter. The method may include determining, by the first device, measurement information based on the count frames and the measurement frames. The method may include providing, by the first device, the measurement information.

BRIEF DESCRIPTION OF THE DRAWINGS

FIG. 5 is a flow chart of an example process for monitoring a data stream of frames based on deep packet inspection.

DETAILED DESCRIPTION

Figure 1A:
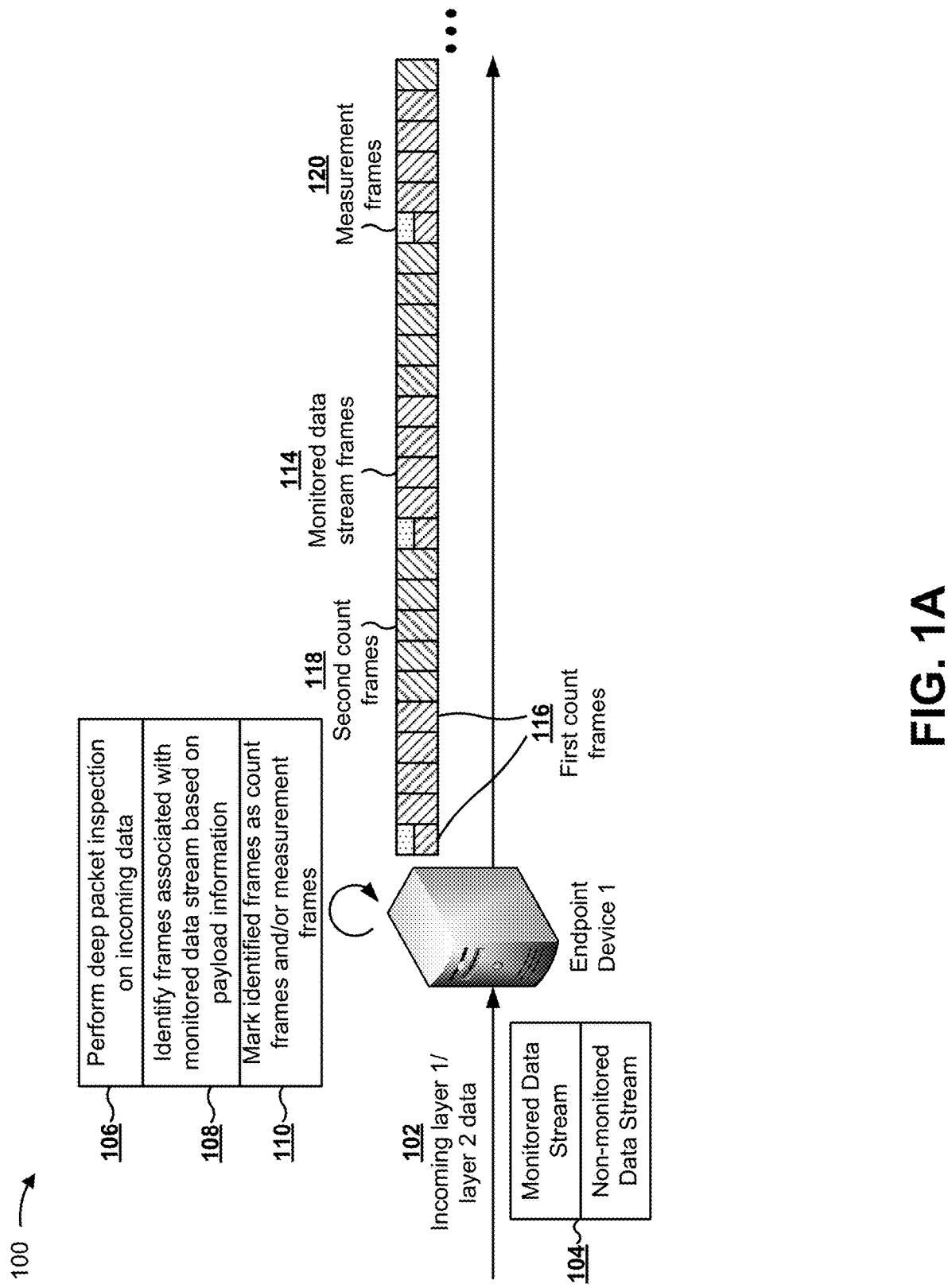
FIGS. 1A-1C are diagrams of an overview of an example implementation described herein.

The following detailed description of example implementations refers to the accompanying drawings. The same reference numbers in different drawings may identify the same or similar elements.

A network may include endpoint devices that carry network traffic between a source of the network traffic and a destination of the network traffic. The network traffic may be associated with a data stream for a service, such as a Voice over Internet Protocol (VoIP) service, a Voice over Long Term Evolution (VoLTE) service, a voice calling service, or the like. In such a case, the network traffic may include frames with fields that identify information for routing or processing the frames (e.g., quality of service indicators, frame identifiers, etc.). The frames may also include a payload. Determination of information in the fields of the packet, other than the payload, may be straightforward using shallow packet inspection or stateful packet inspection. However, it may be more difficult to examine the payload of the packet. In such cases, deep packet inspection may be used.

An endpoint device (or another network device) may monitor network performance based on information included in the frames. For example, the endpoint device may identify a service associated with the frames, and may determine whether the frames meet a performance requirement associated with the service. However, in some cases, the information needed to monitor network performance may be encapsulated in payloads of the packet. For example, many services are provided over a radio interface (e.g., a fronthaul network). Information associated with such services is transported via the backhaul network using physical-layer frames that encapsulate the information associated with the services.

One example of such an encapsulation scheme is the Radio over Ethernet (RoE) scheme, in which an Ethernet frame carries a payload that includes a RoE frame. The RoE frame may include a field that identifies a service associated with the RoE frame (e.g., VoIP, VoLTE, video calling, etc.). It may be desirable to monitor network traffic associated with the service. However, since the RoE frame is encapsulated in the payload of the Ethernet frame, it may be difficult to identify the service associated with the RoE frame using traditional methods.

Implementations described herein identify frames associated with a monitored data stream, based on payloads of the frames, using deep packet inspection. After identifying the frames, implementations described herein mark the payloads of the frames as count frames or measurement frames, which can be used to determine frame loss, frame delay, and/or frame jitter. A downstream device (e.g., an endpoint device) may use deep packet inspect to determine whether the frames are count frames or measurement frames, and may determine measurement information accordingly.

In this way, endpoint devices (and/or network devices) gather measurement information based on deep packet inspection of frames of a monitored data stream. By identifying count frames and measurement frames based on information included in a payload of the frames, the endpoint devices enable monitoring of frames wherein identifying information is encapsulated in the payload, such as Ethernet frames that are carrying Radio over Ethernet (RoE) frames. Furthermore, by measuring network performance using packets of the monitored data stream, rather than dedicated test packets, the endpoint devices generate more accurate and temporally relevant measurement information, and conserve network resources that would otherwise be used to generate dedicated test packets.

Figure 1B:
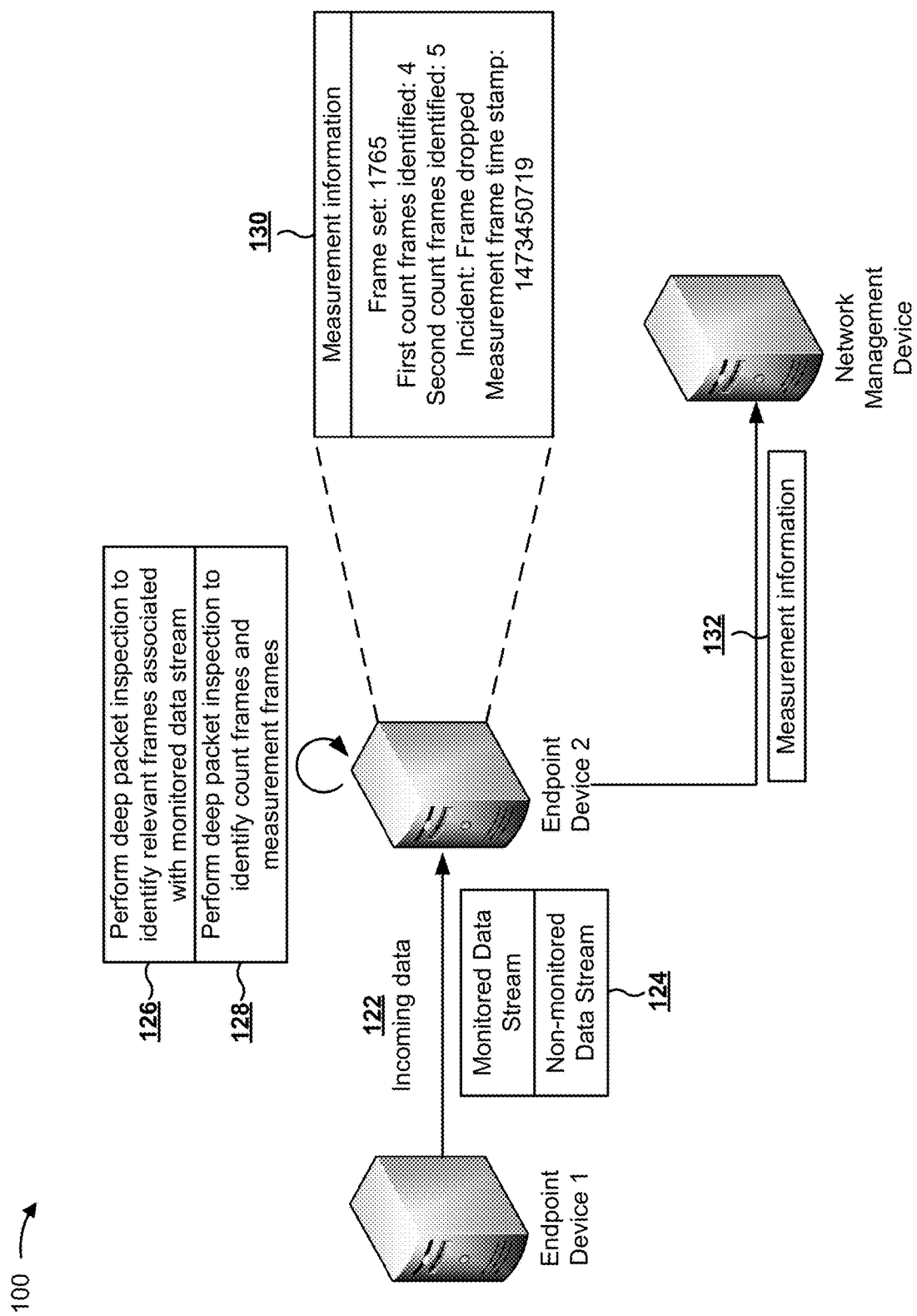
Figure 1C:
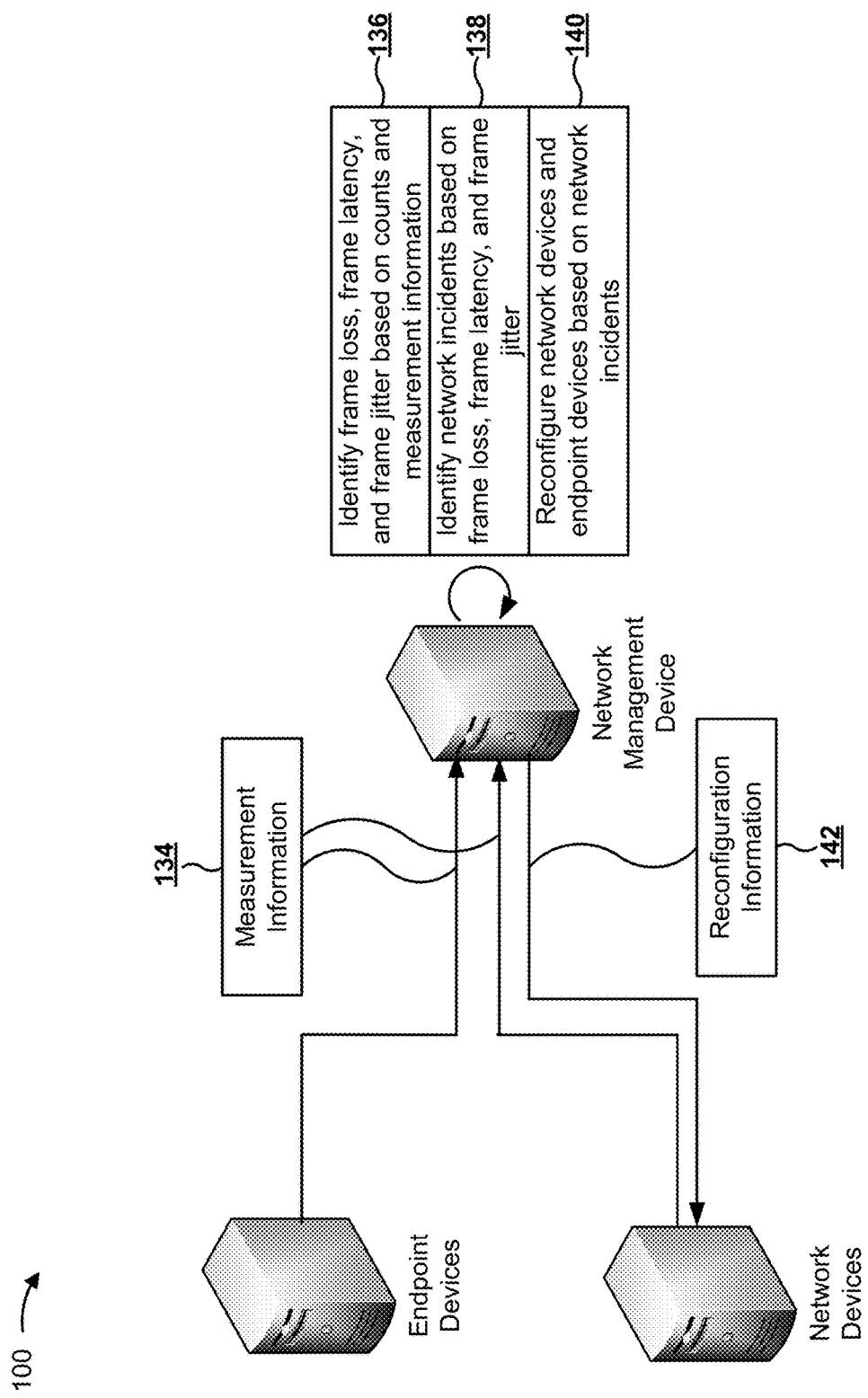

FIGS. 1A-1C are diagrams of an overview of an example implementation 100 described herein. As shown in FIG. 1A, and by reference number 102, an endpoint device 1 may receive incoming data. As further shown, the incoming data may be associated with Layer 1 or Layer 2 of the Open Systems Interconnect (OSI) model (e.g., the physical layer and/or the data link layer). For example, the incoming data may include Ethernet frames.

As shown by reference number 104, the incoming data may include a monitored data stream and a non-monitored data stream. The data streams may include data streams for one or more network services, such as a Voice over IP (VoIP) service, a Voice over LTE (VoLTE) service, a critical service, or the like. In some implementations, the monitored data stream may be associated with a particular quality of service (QoS) requirement, such as a maximum permissible frame loss, frame delay, frame delay variation, or the like. Assume that the frames included in the incoming data include payloads that identify whether the frames are associated with the monitored data stream or the non-monitored data stream (e.g., based on flow identifiers associated with the payloads of the frames, as described in more detail elsewhere herein).

As shown by reference number 106, endpoint device 1 may perform deep packet inspection on the incoming data. Deep packet inspection may include a form of computer network packet filtering that examines the payload of a packet or frame as the packet or frame passes an inspection point. Endpoint device 1 may perform deep packet inspection because shallow packet inspection or stateful packet inspection may be inadequate to determine the content of the payload of the frames, and, therefore, it may be difficult to determine whether the frames are associated with the monitored data stream or the non-monitored data stream. Thus, by performing deep packet inspection, endpoint device 1 enables monitoring of frames, which permits monitoring of network performance without injection of dedicated test packets.

As shown by reference number 108, endpoint device 1 may identify frames associated with the monitored data stream, from the frames of the monitored data stream and the non-monitored data stream, based on payload information included in the frames. For example, endpoint device 1 may determine the payload information based on performing deep packet inspection on each incoming frame. The payload information may include the flow identifiers described above, and the flow identifiers may indicate that the frames are associated with the monitored data stream. Thus, endpoint device 1 identifies frames associated with the monitored data stream and can monitor the monitored data stream without monitoring packets of the non-monitored data stream, which conserves processor and network resources.

As shown by reference number 110, endpoint device 1 may mark the identified frames of the monitored data stream as count frames and/or measurement frames. A count frame is a frame that is to be used to identify a quantity of dropped frames associated with the monitored data stream, and may include a first count frame or a second count frame. A measurement frame is a frame to be used to determine latency (e.g., frame delay) or jitter (e.g., frame delay variation) of the monitored data stream. Endpoint device 1 may mark the identified frames based on modifying bit information of the payloads of the identified frames, thus permitting a downstream endpoint device (e.g., endpoint device 2) to identify the frames as count frames or measurement frames based on deep packet inspection.

The frames of the monitored data stream are shown by reference number 114. As shown by reference number 116, first sequences of five frames may be identified as first count frames. First count frames are shown in FIG. 1A using diagonal hatching from the top left to the bottom right. As shown by reference number 118, second sequences of five frames may be identified as second count frames. Second count frames are shown in FIG. 1A using diagonal hatching from the top right to the bottom left. By comparing a received quantity of first count frames to a received quantity of second count frames, a downstream device may determine a quantity of dropped frames (e.g., based on a difference between the received quantities).

As shown by reference number 120, some frames may be identified as measurement frames (e.g., every tenth frame). Measurement frames are shown in FIG. 1A using a dotted fill. As further shown, the measurement frames are also identified as first count frames. This conserves network resources that would otherwise be used to assign dedicated frames as measurement frames or first count frames. Furthermore, by identifying the frames of the monitored data stream as count frames and/or measurement frames, endpoint device 1 enables measurement of network performance using frames of the monitored data stream, rather than injected test frames, which improves accuracy of the measurement and conserves network resources. In some implementations, other frames may be identified measurement frames (e.g., one or more of the second count frames, one or more other first count frames, etc.). In some implementations, endpoint device 1 may determine measurement information based on the measurement frames. For example, endpoint device 1 may store and/or provide identification information, a frame identifier, and/or a time stamp associated with the measurement frames, which permits determination of latency or jitter associated with the measurement frames.

As shown in FIG. 1B, and by reference number 122, endpoint device 1 may provide the data to endpoint device 2. As shown by reference number 124, the data includes the monitored data stream (e.g., with the count frames and the measurement frames), and the non-monitored data stream. As shown by reference number 126, endpoint device 2 may perform deep packet inspection to identify the frames associated with the monitored data stream. For example, endpoint device 2 may inspect payloads of the frames to determine which frames include flow identifiers that identify the monitored data stream.

As shown by reference number 128, endpoint device 2 may identify the first count frames, the second count frames, and the measurement frames based on deep packet inspection. For example, endpoint device 2 may identify bit values, of the payloads, that were set to particular values by endpoint device 1. The bit values may identify the frames as count frames and/or measurement frames.

As shown by reference number 130, based on the first count frames, the second count frames, and the measurement frames, endpoint device 2 may determine measurement information. As shown, the measurement information includes information identifying a frame set (e.g., a numerical identifier of 1765). For the purpose of FIGS. 1A-1C, assume that a frame set includes ten frames: five frames marked as first count frames, and five frames marked as second count frames. Assume further that a frame set includes one measurement frame.

As shown, endpoint device 2 determines that frame set 1765 includes 4 first count frames and 5 second count frames. Therefore, endpoint device 2 determines that one frame (e.g., a first count frame) was dropped between endpoint device 1 and endpoint device 2. As further shown, endpoint device 2 determines a time stamp associated with the measurement frame (e.g., a Unix time of 1473450719). The time stamp may permit determination of latency or jitter by a network management device. For example, endpoint device 1 and endpoint device 2 may provide respective time stamps, associated with the measurement frame, to the network management device. The network management device may compare the time stamps to determine a latency or jitter associated with endpoint device 1 and endpoint device 2. As shown by reference number 132, endpoint device 2 may provide the measurement information to the network management device.

As shown in FIG. 1C, and by reference number 134, the network management device may receive measurement information from endpoint devices and/or from network devices. A network device may include a device on a route between endpoint devices (e.g., a switch, a hub, a router, or the like). For example, multiple network devices may collect measurement information regarding the first count frames, the second count frames, and the measurement frames, and may provide the measurement information to the network management device. In this way, the network management device may collect information regarding multiple, different hops on a route using count frames and measurement frames, which enables more accurate determination of network performance information and conserves processor and network resources that would otherwise be used to obtain discrete measurements for each hop of the route.

As shown by reference number 136, the network management device may identify frame loss, frame latency, and frame jitter values based on the measurement information. For example, the network management device may determine quantities of dropped frames at one or more hops of a route based on information, from devices on the route, identifying received quantities of first count frames and second count frames. As another example, the network management device may determine frame latency of one or more hops of a route based on time stamps associated with a measurement frame that is transmitted along the route. As yet another example, the network management device may determine frame jitter (e.g., frame delay variation) based on comparing multiple, different frame latency values for one or more hops of a route.

As shown by reference number 138, the network management may identify network incidents based on the frame loss, frame latency, and frame jitter values. For example, the network management device may determine whether the frame loss, frame latency, and/or frame jitter values are within acceptable ranges (e.g., based on a QoS requirement associated with the monitored data stream). When the frame loss, frame latency, and/or frame jitter values are not within the acceptable ranges, the network management device may identify a network incident. In some implementations, the network management device may identify a network incidence based on another measurement determined based on the measurement information, such as a throughput measurement.

As shown by reference number 140, based on identifying a network incident, the network management device may reconfigure one or more network devices and/or endpoint devices. For example, the network management device may reroute traffic based on performance of one or more links associated with one or more network devices and/or endpoint devices. As another example, the network management device may activate or deactivate one or more network devices and/or endpoint devices. As still another example, the network management device may deploy a technician to a device associated with a network incident.

In this way, endpoint devices (and/or network devices) gather measurement information based on deep packet inspection of frames of a monitored data stream. By identifying count frames and measurement frames based on information included in a payload of the frames, the endpoint devices enable monitoring of frames wherein identifying information is encapsulated in the payload, such as Ethernet frames that are carrying Radio over Ethernet (RoE) frames. Furthermore, by measuring network performance using packets of the monitored data stream, rather than dedicated test packets, the endpoint devices generate more accurate and temporally relevant measurement information, and conserve network resources that would otherwise be used to generate dedicated test packets.

As indicated above, FIGS. 1A-1C are provided merely as an example. Other examples are possible and may differ from what was described with regard to FIGS. 1A-1C.

Figure 2:
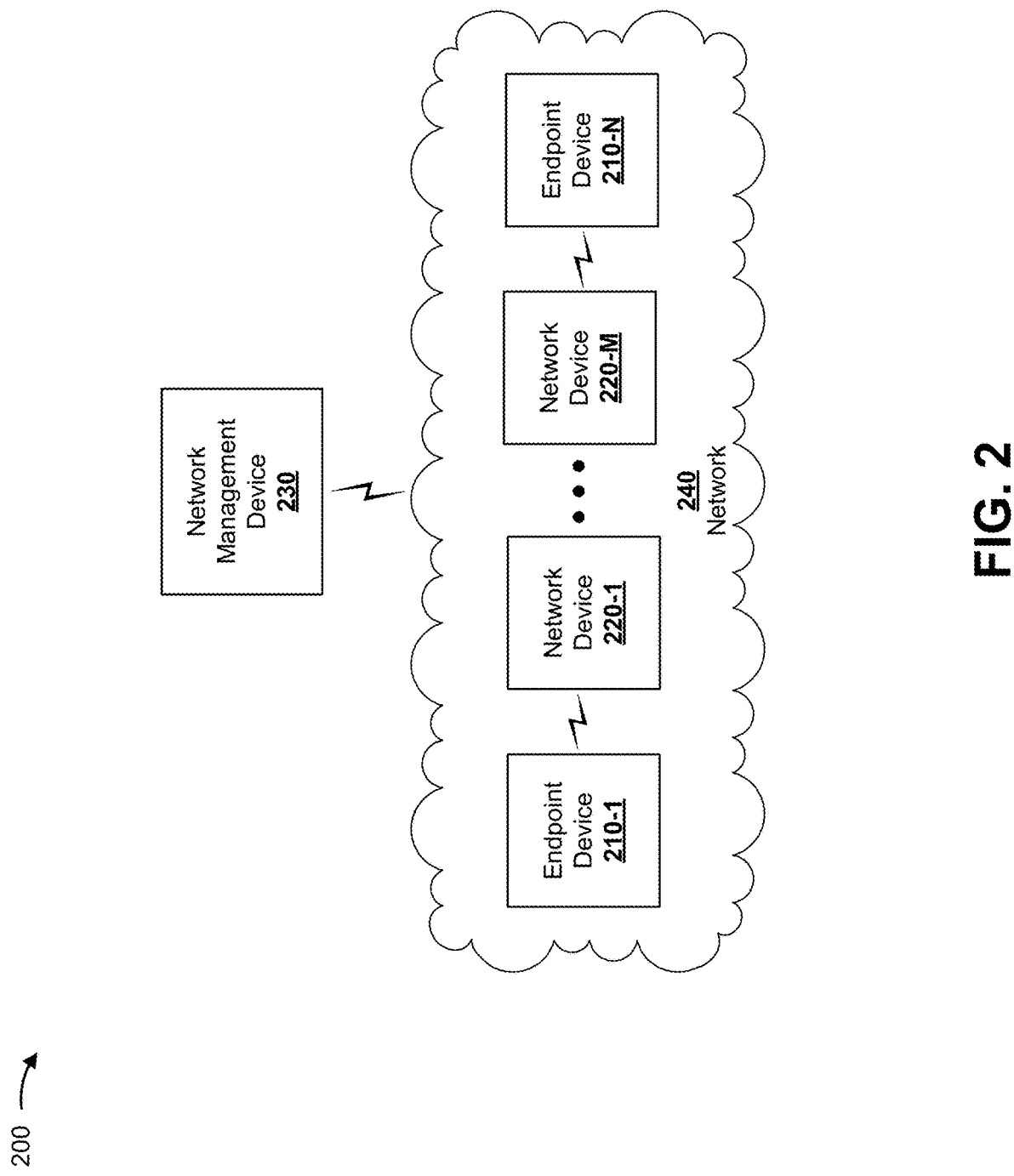
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more endpoint devices 210-1 through 210-N (N≥1) (hereinafter referred to collectively as "endpoint devices 210," and individually as "endpoint device 210"), one or more network devices 220-1 through 220-M (M≥1) (hereinafter referred to collectively as "network devices 220," and individually as "network device 220"), a network management device 230, and a network 240. Devices of environment 200 may interconnect via wired connections, wireless connections, or a combination of wired and wireless connections.

Endpoint device 210 includes one or more devices capable of receiving and/or providing information over a network (e.g., network 240), and/or capable of generating, storing, and/or processing information received and/or provided over the network. For example, endpoint device 210 may include a computing device, such as a laptop computer, a tablet computer, a handheld computer, a desktop computer, a mobile phone (e.g., a smart phone, a radiotelephone, etc.), a personal digital assistant, a network device (e.g., a router, a gateway, a firewall, a hub, a bridge, etc.), a router, a hub, a switch, or a similar device. Endpoint device 210 may act as an endpoint (e.g., a source and/or a destination) for a communication with another endpoint device 210. For example, a first endpoint device 210 may provide information to a second endpoint device 210 (e.g., via network device 220 and/or network 240).

Network device 220 includes one or more devices (e.g., one or more traffic transfer devices) capable of processing and/or transferring traffic between endpoint devices 210. For example, network device 220 may include a firewall, a router, a gateway, a switch, a hub, a bridge, a reverse proxy, a server (e.g., a proxy server), a security device, an intrusion detection device, a load balancer, or a similar device.

Network management device 230 includes one or more devices capable of receiving, generating, storing, processing, and/or providing information, such as measurement information and/or information for reconfiguring endpoint device 210 and/or network device 220. For example, network management device 230 may include one or more computing devices, such as one or more server devices, desktop computers, workstation computers, virtual machines (VMs) provided in a cloud computing environment, a self-organizing network (SON) system, or similar devices. In some implementations, network management device 230 may be utilized by an entity that manages and/or operates one or more portions of environment 200, such as, for example, a telecommunication service provider, a television service provider, an Internet service provider, or the like. In some implementations, network management device 230 may be utilized by an entity that manages and/or operates a mobile network. In some implementations, network management device 230 may be centralized (e.g., in a backhaul network, etc.). Additionally, or alternatively, network management device 230 may be distributed (e.g., may be distributed over two or more endpoint devices 210, two or more network devices 220, etc.).

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
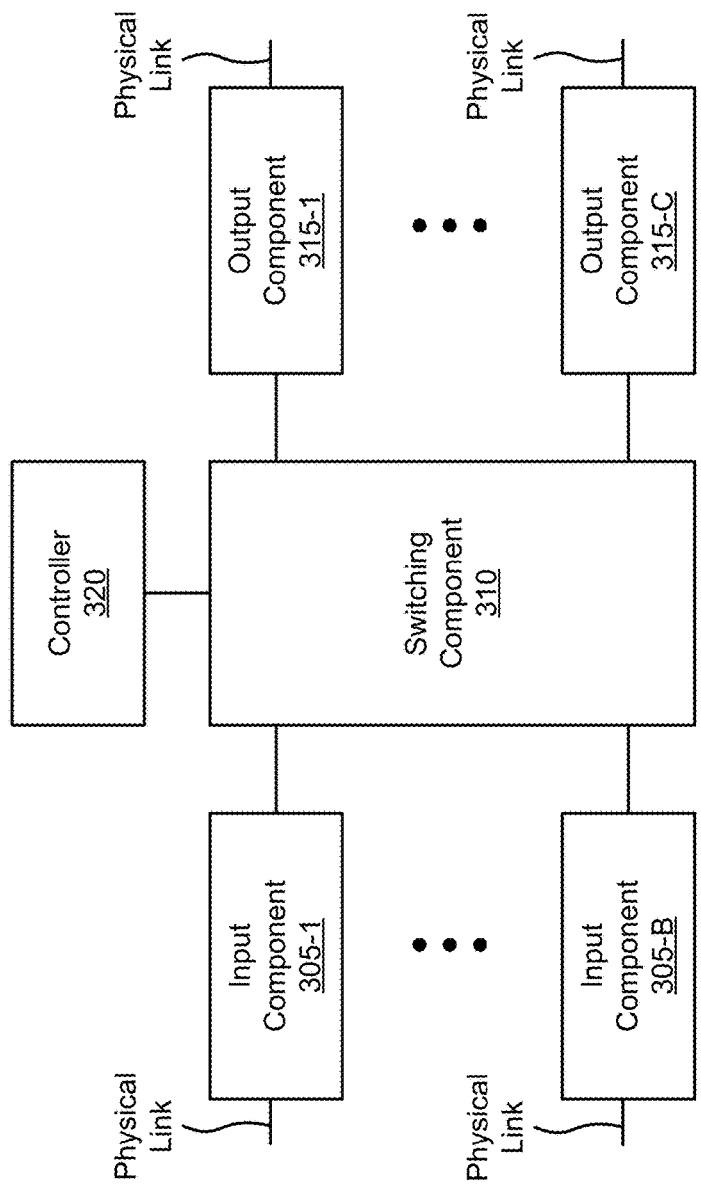
FIG. 3 is a diagram of example components of a network device of FIG. 2.

FIG. 3 is a diagram of example components of a device 300. Device 300 may correspond to network device 220. In some implementations, network device 220 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections, wireless connections, or a combination of wired and wireless connections.

Input component 305 includes a point of attachment for a physical link connected to device 300, and may be a point of entry for incoming traffic (e.g., packets, frames, etc.) received by device 300. Input component 305 may process incoming traffic, such as by performing data link layer encapsulation or decapsulation. In some implementations, input component 305 may send and/or receive packets. As used herein, a packet may refer to a network packet, a frame, a datagram, a segment, a fragment of a network packet, a fragment of a frame, a fragment of a datagram, a fragment of a segment, or any other formatted or unformatted unit of data capable of being transmitted via a network. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 interconnects input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 includes a point of attachment for a physical link connected to device 300, and may be a point of exit for outgoing traffic (e.g., packets) transmitted by device 300. Output component 315 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a microcontroller, a field-programmable gate array (FPGA), an application-specific integrated circuit (ASIC), and/or another type of processor that can interpret and/or execute instructions. The processor is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
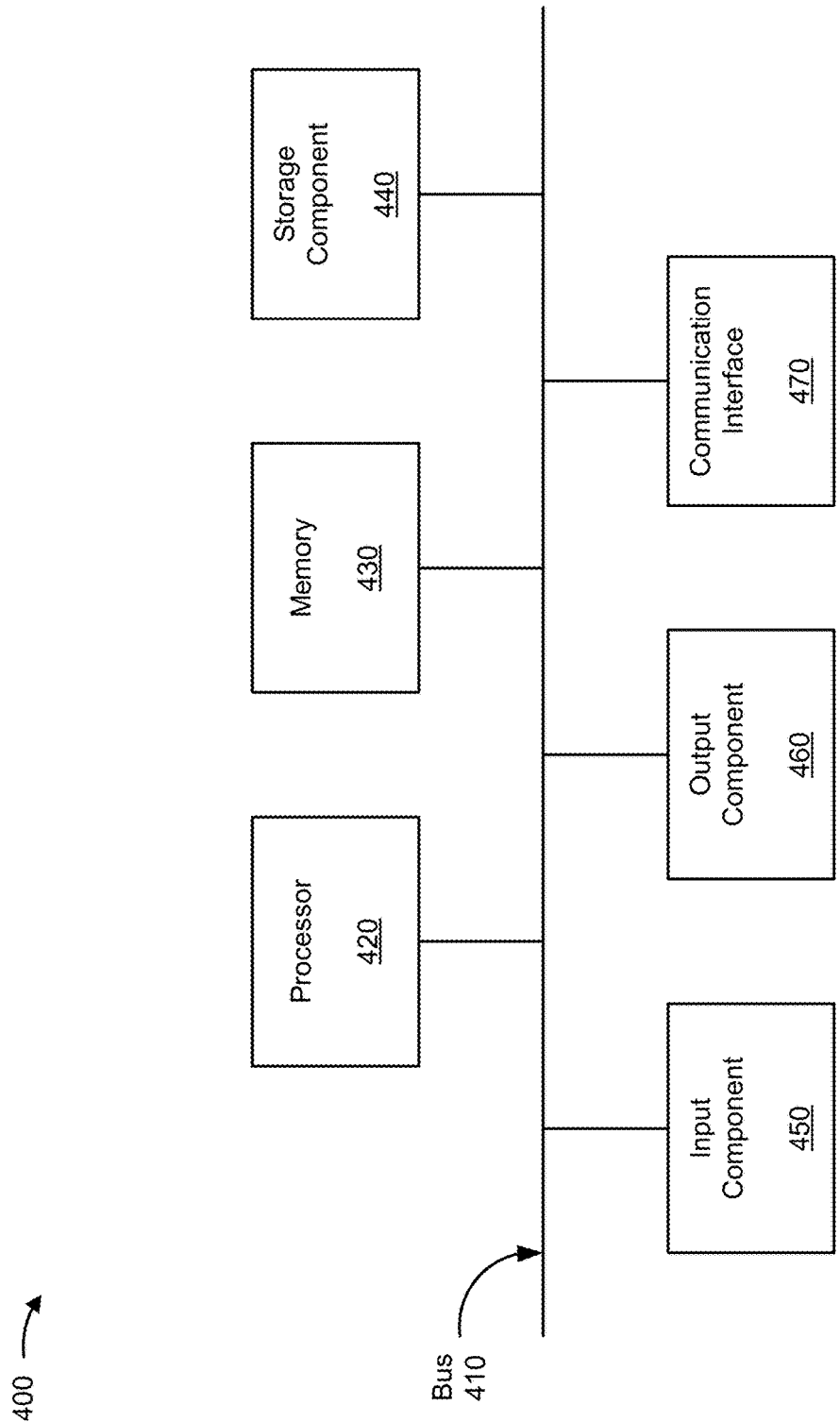
FIG. 4 is a diagram of example components of one or more devices of FIG. 2.

FIG. 4 is a diagram of example components of a device 400. Device 400 may correspond to endpoint device 210 and/or network management device 230. In some implementations, endpoint device 210 and/or network management device 230 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 may include a component that permits communication among the components of device 400. Processor 420 is implemented in hardware, firmware, or a combination of hardware and software. Processor 420 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 420 may include one or more processors capable of being programmed to perform a function. Memory 430 may include a random access memory (RAM), a read only memory (ROM), and/or another type of dynamic or static storage device (e.g., a flash memory, a magnetic memory, an optical memory, etc.) that stores information and/or instructions for use by processor 420.

Storage component 440 may store information and/or software related to the operation and use of device 400. For example, storage component 440 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 450 may include a component that permits device 400 to receive information, such as via user input (e.g., a touch screen display, a keyboard, a keypad, a mouse, a button, a switch, a microphone, etc.). Additionally, or alternatively, input component 450 may include a sensor for sensing information (e.g., a global positioning system (GPS) component, an accelerometer, a gyroscope, an actuator, etc.). Output component 460 may include a component that provides output information from device 400 (e.g., a display, a speaker, one or more light-emitting diodes (LEDs), etc.).

Communication interface 470 may include a transceiver-like component (e.g., a transceiver, a separate receiver and transmitter, etc.) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, or the like.

Device 400 may perform one or more processes described herein. Device 400 may perform these processes in response to processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 for monitoring a data stream of frames based on deep packet inspection. In some implementations, one or more process blocks of FIG. 5 may be performed by endpoint device 210. In some implementations, one or more process blocks of FIG. 5 may be performed by another device or a group of devices separate from or including endpoint device 210, such as network device 220 and network management device 230.

As shown in FIG. 5, process 500 may include receiving a monitored data stream that includes frames to be monitored (block 505). For example, endpoint device 210-1 may receive one or more data streams, including a monitored data stream. The data streams may include data streams for one or more network services, such as a VoIP service, a VoLTE service, a critical service, or the like. In some implementations, the monitored data stream of frames may include an Ethernet layer stream of frames, such as a Layer 1 stream, a Layer 2 stream, or the like. Endpoint device 210-1 may receive the data streams from a user device, a network element (e.g., a base station, an eNode B, etc.), or any other device.

The data stream may include frames, such as Ethernet Layer frames, transport layer frames, physical layer frames, or the like. A frame includes a set of fields that define parameters (e.g., using bit values, byte values, octets, or the like) that are used to transport information across the physical layer. The fields may include, for example, header fields, such as a preamble (e.g., 8 bytes), a destination network address (e.g., a MAC address, etc.), a source MAC address, a field to identify a traffic type or protocol, a field to identify a priority level, a field to identify a QoS requirement, or the like. The fields may further include a payload of information to be transmitted via the physical layer.

In some implementations, a frame may include or carry a RoE frame. In such a case, the payload of the frame may include an RoE frame that identifies information related to a radio transmission, such as data to be carried by the radio transmission, a quantity of bits, bytes, or octets associated with the radio transmission, a type associated with the radio transmission (e.g., 3G, 5G, 5G, LTE, etc.), a payload of the radio transmission, or the like. RoE frames may be used to transport radio access network (RAN) traffic across physical links via the Ethernet layer (e.g., Layer 1 and/or Layer 2).

In some implementations, endpoint device 210-1 may receive multiple, different data streams. In such a case, each data stream may be associated with a respective service. Some services may be associated with QoS requirements that define latency thresholds, packet loss thresholds, or the like. For example, a particular data stream may be associated with a QoS requirement that indicates that fewer than a particular quantity of packets or frames are to be dropped or corrupted. As another example, a particular data stream may be associated with a QoS requirement that identifies a maximum permissible latency. When endpoint device 210-1 receives multiple data streams, frames associated with each of the multiple data streams may be received by endpoint device 210 in an unordered fashion. For example, endpoint device 210-1 may receive one or more frames associated with a first data stream, then may receive one or more frames associated with a second data stream, then may receive frames associated with the first data stream.

As further shown in FIG. 5, process 500 may include identifying the frames to be monitored based on deep packet inspection (block 510). For example, frames may be associated with identifying information that identifies a data stream associated with the frames. As a more particular example, a frame carrying an encapsulated RoE frame may include a flow identifier in a payload of the frame that identifies a data stream associated with the RoE frame. For example, the flow identifier may identify a classification of the data stream (e.g., VoLTE, VoIP, video call, etc.), and endpoint device 201-1 may identify the data stream based on the classification. This identifying information may be difficult to obtain based on Internet-layer inspection. For example, traditional packet inspection techniques such as stateful packet inspection may not inspect the payload of a packet or frame, and therefore may not be capable of obtaining the identifying information.

Endpoint device 210-1 may use deep packet inspection to inspect the payload of the frames to determine identifying information. Deep packet inspection is a form of computer network packet filtering that examines the payload of a packet or frame as the packet or frame passes an inspection point (e.g., endpoint device 210 or network device 220). By using deep packet inspection, endpoint device 210-1 enables monitoring of data streams that use a flow identifier in the payload of frames associated with the data streams.

In some implementations, endpoint device 210-1 may identify a monitored data stream based on other information and/or based on deep packet inspection. For example, endpoint device 210-1 may identify a monitored data stream based on geolocation information included in a payload of a frame, a subscriber identifier identified by the payload of the frame (e.g., an international mobile subscriber identity (IMSI), an international mobile station equipment identity (IMEI), etc.), subscriber information inferred based on a device from which the frame is received (e.g., an S1 application protocol (S1AP) identifier), a radio channel quality at which a payload of the frame (e.g., an RoE frame) was received or transmitted, a radio access network (RAN) control message type (e.g., a call setup message type or a call setup response message type), information indicating whether the frame has retransmitted data, a security message associated with a payload of the frame, a device type of a user equipment (UE) from which the frame originated or to which the frame is destined. As another example, endpoint device 210-1 may identify a monitored data stream based on an indicator of message content to an end user (e.g., an identifier of advertisement content, an indicator of peer-to-peer content, etc.).

In some implementations, endpoint device 210-1 may identify a monitor data stream based on information associated with a frame. For example, assume that a particular frame includes a subscriber identifier associated with a particular subscriber. In that case, endpoint device 210 may obtain information associated with the particular subscriber based on the subscriber identifier (e.g., geolocation information, radio channel quality information, etc.). Endpoint device 210-1 may identify the monitored data stream based on the information associated with the particular subscriber. In this way, endpoint device 210-1 identifies a monitored data stream based on subscriber information, which increases a variety of data streams that can be monitored and permits more robust diagnosis of network incidents, thereby improving network performance.

In some implementations, endpoint device 210-1 may identify a monitored data stream based on a slice of a 5G network. For example, a 5G network may support multi-tenancy and may include an infrastructure that supports multiple operators of different types. Consequently, an individual operator or network function's scope of control may be constrained to one or more portions or "slices" of the network infrastructure subject to an agreement with the infrastructure owner to receive the network as a service. Endpoint device 210-1 may identify frames associated with a particular slice, and may identify the frames as associated with a monitored data stream based on the frames being associated with the particular slice.

In some implementations, the deep packet inspection may be performed by a probe implemented by endpoint device 210-1. In some implementations, the probe may be dynamically instantiated as a virtual probe using a virtualization infrastructure that may exploit an acceleration layer to allow virtualized entities to perform real time operations. For example, the acceleration layer may be supplied by FPGA resources that may be dynamically programmed using a partial reprogramming functionality that allows other functions to perform uninterrupted while the new function is being instantiated. This may support mobile edge computing (MEC), and may prevent interruption of other functions as deep packet inspection is performed.

As further shown in FIG. 5, process 500 may include adding, to the frames to be monitored, bit information identifying the frames to be monitored as first count frames, second count frames, and/or measurement frames (block 515). For example, endpoint device 210-1 may add, to frames associated with the monitored data stream, bit information. The bit information may identify the frames as first count frames, second count frames, and/or measurement frames. For example, a first bit associated with a frame may be set to a first value to identify the frame as a first count frame or to a second value to identify the frame as a second count frame. As another example, a second bit associated with the frame may be set to a first value to identify the frame as a measurement frame, and may be set to a second value, or may be unmodified by endpoint device 210-1, when the frame is not a measurement frame. In some implementations, a frame may be identified as a first count frame and a measurement frame, or as a second count frame and a measurement frame. By using some frames as both count frames and measurement frames, endpoint device 210-1 conserves network resources and eliminates the need for injection of a test packet to test the data stream.

In some implementations, endpoint device 210-1 may use a particular field or portion of a field, of a frame, to identify the frame as a count frame and/or a measurement frame. As one possible example, for an RoE frame, endpoint device 210-1 may set a value of one or more bits of a subtype field or a length field of the RoE frame. Continuing the above example, a first bit of the subtype field or the length field may be set to a particular value (e.g., 0 or 1) to identify measurement frames, a second bit of the subtype field may be set to a first value to identify a first count packet, and the second bit may be set to a second value to identify a second count packet. In some implementations, one or more bits of the subtype field or the length field may be designated for use to identify the frames. For example, the subtype field may be shortened from 16 bits to 14 bits. Additionally, or alternatively, the length field may be shortened from 32 bits to 30 bits. Other implementations are possible using any one or more bits of a frame, and implementations described herein are not limited to those that use the subtype field or the length field.

As further shown in FIG. 5, process 500 may include providing the monitored data stream (block 520). For example, endpoint device 210-1 may provide the monitored data stream to endpoint device 210-2. In some implementations, endpoint device 210-1 may provide the monitored data stream via one or more network devices 220. In some implementations, endpoint device 210-1 may provide multiple different data streams, such as one or more monitored data streams and/or one or more unmonitored data streams.

As further shown in FIG. 5, process 500 may include receiving the monitored data stream (block 525). For example, endpoint device 210-2 may receive the monitored data stream. In some implementations, endpoint device 210-2 may receive the monitored data stream from endpoint device 210-1 (e.g., via one or more network devices 220). In some implementations, endpoint device 210-2 may receive multiple, different data streams, such as one or more monitored data streams and/or one or more unmonitored data streams. In some implementations, the operations described as being performed by endpoint device 210-2 may be performed by network device 220. For example, network device 220 may be associated with a deep packet inspection engine, may identify frames of a monitored data stream as count frames and/or measurement frames, and/or may determine measurement information based on the identified frames. In this way, multiple endpoint devices 210 and/or network devices 220 may gather and/or provide measurement information, which permits determination of measurement information for multiple hops of a route.

As further shown in FIG. 5, process 500 may include identifying the frames to be monitored based on deep packet inspection (block 530). For example, endpoint device 210-2 may identify frames that associated with a monitored data stream. Endpoint device 210-2 may identify the frames based on information, included in the frame, that identifies the data stream associated with the frame. For example, the frames may include a flow identifier that identifies the data stream associated with the frame. In such a case, the flow identifier may be included in a payload of the frame (e.g., when the frame includes an RoE frame, etc.), and endpoint device 210-2 may use deep packet inspection to obtain the flow identifier. By using deep packet inspection to identify the flow identifier, endpoint device 210-2 facilitates performance measurement of packets that are associated with identifying information in the payload of the packets, thereby improving network performance. Further, this measurement process can be performed without injection of dedicated test packets, which conserves network resources and provides more accurate measurement information than measurement information obtained based on injected test packets.

As further shown in FIG. 5, process 500 may include identifying the bit information (block 535). For example, endpoint device 210-2 may identify the bit information that identifies the frames as first count frames, second count frames, and/or measurement frames. In some implementations, endpoint device 210-2 may identify the bit information based on deep packet inspection. For example, when the bit information is included in a payload of a frame (e.g., when the frame includes an RoE frame), endpoint device 210-2 may use deep packet inspection to identify the bit information. In this way, endpoint device 210-2 facilitates measurement of network performance based on deep packet inspection, which permits determination of network performance with regard to frames that include identifying information in a payload of the frames (e.g., RoE frames).

As further shown in FIG. 5, process 500 may include determining measurement information based on quantities of the first count frames and the second count frames, and based on time information associated with the frames to be monitored (block 540). For example, endpoint device 210-2 may determine measurement information based on the first count frames, the second count frames, and the measurement frames. In some implementations, the measurement information may identify a quantity or ratio of dropped frames associated with the monitored data stream. Additionally, or alternatively, the measurement information may identify a latency associated with the monitored data stream (e.g., an average latency, a highest latency, a latency for a particular frame, etc.).

In some implementations, endpoint device 210-2 may determine a quantity of dropped frames based on the first count frames and the second count frames. To determine the quantity of dropped frames, endpoint device 210-2 may compare a first quantity of received first count frames to a second quantity of received second count frames. When the first quantity does not match the second quantity, endpoint device 210-2 may determine that one or more frames have been dropped. For example, endpoint device 210-2 may determine a difference between the first quantity and the second quantity to determine the quantity of dropped frames. This may be possible based on endpoint device 210-1 generating an equal amount of first count frames and second count frames.

In some implementations, endpoint device 210-2 may determine time information corresponding to a measurement frame. The time information may identify a time at which endpoint device 210-2 received the measurement frame and/or a time at which endpoint device 210-1 provides the measurement frame. In such a case, endpoint device 210-2 may store the measurement frame and/or information identifying the measurement frame (e.g., an identifier associated with the measurement frame, etc.). By storing the measurement frame, endpoint device 210-2 can more reliably identify the measurement frame (e.g., based on an identifier potentially being shared by two or more frames). By storing the information identifying the measurement frame, endpoint device 210-2 conserves storage resources.

As further shown in FIG. 5, process 500 may include transmitting the monitored data stream toward a destination (block 545). For example, endpoint device 210-2 may provide the monitored data stream toward a destination of the monitored data stream. In some implementations, endpoint device 210-2 may provide information associated with the monitored data stream, such as measurement information. In some implementations, endpoint device 210-2 may remove the bit information from the monitored data stream before providing the monitored data stream toward the destination, which conserves network resources. In some implementations, endpoint device 210-2 may provide the monitored data stream including the bit information, which conserves processor resources of endpoint device 210-2, reduces latency, and permits subsequent recipients to perform analysis or determine measurement information based on the bit information.

As further shown in FIG. 5, process 500 may include storing and/or providing the measurement information (block 550). For example, endpoint device 210-2 may store and/or provide the measurement information. In some implementations, endpoint device 210-2 may provide the measurement information to network management device 230. In some implementations, endpoint device 210-2 may provide the measurement information periodically. For example, endpoint device 210-2 may store measurement information as endpoint device 210-2 determines the measurement information, and may provide the stored measurement information periodically (e.g., daily, weekly, etc.). By periodically providing measurement information, endpoint device 210-2 conserves network resources.

In some implementations, endpoint device 210-2 may provide the measurement information as endpoint device 210-2 determines the measurement information (e.g., continuously, in real time, in substantially real time, etc.). In some implementations, endpoint device 210-2 may provide the measurement information based on a request. For example, endpoint device 210-2 may receive a request for part of or all the measurement information, and may provide the part of or all of the measurement information based on the request. By providing the measurement information on request, endpoint device 210-2 conserves network resources that would otherwise be used to provide the measurement information periodically or continuously.

In some implementations, endpoint device 210-2 may provide information identifying a quantity of dropped frames associated with the monitored data stream. Additionally, or alternatively, endpoint device 210-2 may provide time information that identifies times associated with one or more measurement frames. Additionally, or alternatively, endpoint device 210-2 may provide the one or more measurement frames. Additionally, or alternatively, endpoint device 210-2 may provide length information identify a length of the one or more monitored frames, the first count frames, and/or the second count frames.

Network management device 230 may determine network performance information based on the measurement information. For example, network management device 230 may receive, from two endpoint devices 210, measurement information that identifies two time stamps associated with a measurement frame. Based on the two time stamps, network management device 230 may determine a latency associated with the measurement frame. As another example, network management device 230 may receive time information from multiple devices associated with a measurement frame, and may determine multiple, different latencies associated with the measurement frame (e.g., an overall latency across the multiple devices, latencies between two or more of the multiple devices, etc.). As yet another example, network management device 230 may receive time information for multiple, different measurement frames, and may identify a change in a network performance value based on the time information (e.g., an increase or decrease in latency, a time at which latency typically increases or decreases, particular hops or routes associated with poor latency, etc.). As still another example, network management device 230 may receive information identifying lengths of one or more frames (e.g., measurement frames and/or count frames) and may determine a throughput based on the lengths and/or based on time information.

In some implementations, network management device 230 may receive measurement information from multiple different devices (e.g., endpoint device 210 and/or network device 220). For example, the multiple, different devices may be associated with different paths in a network with a redundant path topology. In such a case, network management device 230 may compare measurement information from the multiple, different devices to determine network performance information for each of the different paths. For example, network management device 230 may determine that a first path is associated with a higher packet loss count than a second path based on comparing quantities of first count frames to quantities of second count frames on the first path and the second path. As another example, network management device 230 may compare latency and/or jitter values on the first path and the second path based on measurement frames transmitted via the first path and the second path. Based on the network performance information, network management device 230 may reconfigure one or more endpoint devices 210 and/or network devices 220, as described in more detail below.

In some implementations, network management device 230 may configure one or more devices based on the measurement information. For example, network management device 230 may determine that a particular path is associated with a threshold quantity of dropped frames, and may cause network traffic to be routed via a different path. As another example, network management device 230 may determine that a QoS requirement is not being satisfied for a particular data stream (e.g., a monitored data stream) and may cause one or more devices to be reconfigured to prioritize the particular data stream. As yet another example, network management device 230 may determine that a monitored data stream is associated with a threshold quantity or ratio of dropped frames, and may cause the monitored data stream to be transmitted on two or more paths to reduce the quantity or ratio of dropped frames. As still another example, network management device 230 may cause one or more network devices 220 or endpoint devices 210 to be activated or deactivated based on the measurement information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

In this way, endpoint devices (and/or network devices) gather measurement information based on deep packet inspection of frames of a monitored data stream. By identifying count frames and measurement frames based on information included in a payload of the frames, the endpoint devices enable monitoring of frames wherein identifying information is encapsulated in the payload, such as Ethernet frames that are carrying RoE frames. Furthermore, by measuring network performance using packets of the monitored data stream, rather than dedicated test packets, the endpoint devices generate more accurate and temporally relevant measurement information, and conserve network resources that would otherwise be used to generate dedicated test packets.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items, and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A first device for determining measurement information for a network, comprising:
 one or more processors configured to:
  identify one or more data streams of frames for monitoring;
  modify the frames of the one or more data streams to identify the frames as:
   first count frames,
   second count frames,
    the first count frames and the second count frames to be used to identify a quantity of dropped frames, and
   measurement frames,
    the measurement frames to be used to determine latency or jitter,
    at least one frame, of the frames, being marked as a first count frame and a measurement frame; and
  transmit the one or more data streams toward a second device to permit the second device to collect the measurement information based on identifying the first count frames, the second count frames, or the measurement frames,
   the second device is to determine the quantity of dropped frames based on comparing a quantity of the first count frames received by the second device to a quantity of the second count frames received by the second device.

2. The first device of claim 1, where the measurement information to be collected by the second device is second measurement information; and
 where the one or more processors are further configured to:
  collect first measurement information regarding the frames,
   the first measurement information including one or more of:
    a quantity of the first count frames,
    time information associated with the measurement frames,
    lengths of the frames, or
    identification information associated with the measurement frames.

3. The first device of claim 2, where the one or more processors are further configured to:
 provide the first measurement information to a third device,
  the first measurement information and the second measurement information causing the third device to determine the latency or the jitter.

4. The first device of claim 1, where the one or more processors, when identifying the one or more data streams of frames, are configured to:
identify the one or more data streams based on information included in a payload of the frames.

5. The first device of claim 4, where the information included in the payload identifies classifications of the frames associated with the one or more data streams,
the one or more data streams being identified based on the classifications.

6. The first device of claim 1, where the one or more processors are further to:
determine that a quality of service (QoS) is not being satisfied for the one or more data streams based on the measurement information; and
cause the first device to be reconfigured to prioritize the one or more data streams based on determining that the QoS is not being satisfied.

7. A non-transitory computer-readable medium storing instructions, the instructions comprising:
one or more instructions that, when executed by one or more processors of a first device, cause the one or more processors to:
identify a monitored data stream of frames based on information included in payloads of the frames;
modify the frames to identify the frames as:
first count frames,
second count frames,
the first count frames and the second count frames to be used to identify a quantity of dropped frames, and
measurement frames to be used to determine latency or jitter,
at least one frame, of the frames, being marked as a first count frame and a measurement frame; and
transmit the monitored data stream toward a second device to permit the second device to collect measurement information based on identifying the first count frames, the second count frames, or the measurement frames,
the second device is to determine the quantity of dropped frames based on comparing a quantity of the first count frames received by the second device to a quantity of the second count frames received by the second device.

8. The non-transitory computer-readable medium of claim 7, where the one or more instructions that, when executed by the one or more processors, further cause the one or more processors to:
assign a value of a first bit of a payload of the at least one frame to identify the at least one frame as the first count frame; and
assign a value of a second bit of the payload of the at least one frame to identify the at least one frame as the measurement frame.

9. The non-transitory computer-readable medium of claim 8,
where the one or more instructions, that cause the one or more processors to assign the value of the first bit, cause the one or more processors to:
assign a first value of the first bit to identify the first count frames; and
assign a second value of the first bit to identify the second count frames.

10. The non-transitory computer-readable medium of claim 7, where the measurement information corresponding to the measurement frames identifies frame identifiers associated with the measurement frames, time information associated with the measurement frames, or length information identifying lengths of the measurement frames.

11. The non-transitory computer-readable medium of claim 7, where the measurement information obtained by the second device is second measurement information; and
where the one or more instructions, when executed by the one or more processors, further cause the one or more processors to:
obtain first measurement information regarding the frames,
the first measurement information identifying at least one of:
a quantity of first count frames,
time information associated with the measurement frames,
lengths of the first count frames or the measurement frames, or
frame identifiers associated with the measurement frames.

12. The non-transitory computer-readable medium of claim 7, where the one or more instructions, that cause the one or more processors to identify the monitored data stream, cause the one or more processors to:
identify the monitored data stream based on deep packet inspection,
the monitored data stream being identified based on a flow identifier included in payloads of the frames.

13. The non-transitory computer-readable medium of claim 7, where the frames comprise physical layer frames.

14. The non-transitory computer-readable medium of claim 13, where payloads of the physical layer frames include Radio over Ethernet (RoE) frames.

15. A method for determining measurement information for a network, comprising:
receiving, by a first device and from a second device, a data stream of frames;
identifying, by the first device, the data stream as a monitored data stream based on information included in payloads of the frames;
identifying, by the first device and based on information included in the payloads of the frames, the frames as:
first count frames,
second count frames,
the first count frames and the second count frames to be used to identify a quantity of dropped frames, and
measurement frames to be used to determine latency or jitter,
at least one frame, of the frames, being marked as a count frame and a measurement frame;
determining, by the first device, the quantity of dropped frames based on comparing a quantity of the first count frames received by the first device to a quantity of the second count frames received by the first device;
determining, by the first device, the measurement information based on the first count frames, the second count frames, and the measurement frames,
the measurement information including information associated with the quantity of dropped frames; and
providing, by the first device, the measurement information.

16. The method of claim 15, where identifying the data stream as the monitored data stream comprises:
identifying the data stream as the monitored data stream based on deep packet inspection; and where identifying the frames comprises:
  identifying the frames as the first count frames and the measurement frames based on the deep packet inspection.

17. The method of claim 15, wherein the measurement information is first measurement information,
  the first measurement information corresponding to second measurement information to be gathered by the second device based on the monitored data stream,
  the first measurement information and the second measurement information being used to determine the latency or the jitter.

18. The method of claim 15, where the monitored data stream is one of a plurality of data streams received by the first device.

19. The method of claim 18, where the monitored data stream is a first data stream of the first count frames and first measurement frames; and where the method further comprises:
  identifying a second data stream of the plurality of data streams;
  identifying the second count frames and second measurement frames, of the second data stream, based on deep packet inspection;
  determining the measurement information for the second data stream based on the second count frames and the second measurement frames; and
  providing the measurement information for the second data stream.

20. The method of claim 15, where a value of a first bit of a payload of the at least one frame is assigned to identify the at least one frame as the first count frame; and
  where a value of a second bit of the payload of the at least one frame is assigned to identify the at least one frame as the measurement frame.

* * * * *